Feb. 24, 1970     J. J. TUZSON     3,496,962
CONTROL VALVE
Filed Feb. 13, 1967
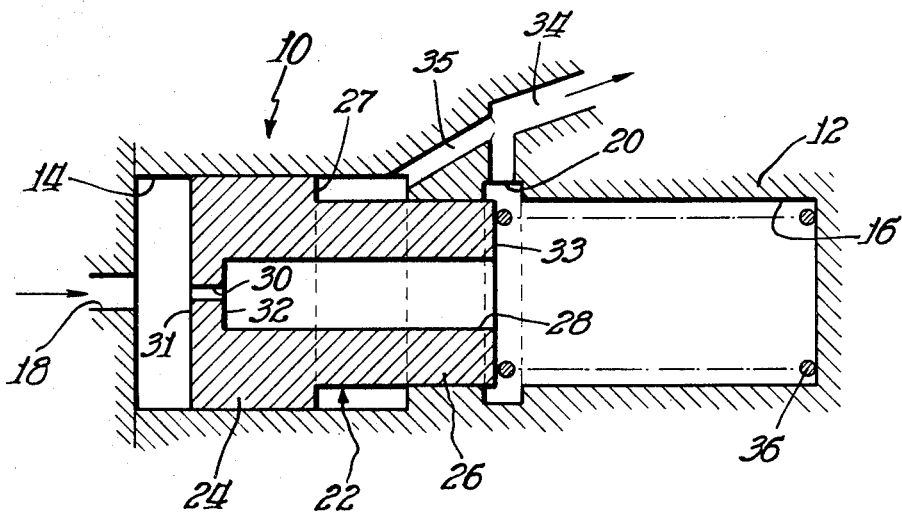
Inventor:
John J. Tuzson
By: Robert L. Zieg   Atty.

United States Patent Office 3,496,962
Patented Feb. 24, 1970

3,496,962
CONTROL VALVE
John J. Tuzson, Evanston, Ill., assignor to Borg-Warner Corporation, Chicago, Ill., a corporation of Illinois
Filed Feb. 13, 1967, Ser. No. 615,548
Int. Cl. F16k *31/363, 17/24*
U.S. Cl. 137—504
5 Claims

ABSTRACT OF THE DISCLOSURE

A flow control valve for a hydraulic circuit having an orifice controlled by a spool whereby in response to increased pressure differential between inlet and outlet, the spool will move to restrict the orifice to decrease the flow including a shoulder on said spool exposed to downstream pressure.

---

The present invention relates to a valve of the pressure regulating type wherein a restricted orifice in a hollow spool normally is spring-biased to a position to permit a relatively high rate of flow, wherein the spool is moved against the force of the spring to a position in which fluid flow is decreased by the pressure drop through a restricted orifice in the spool and wherein the force of the spring may be complemented by fluid back pressure acting on a shoulder on the spool. This is desirable, for instance, in the operation of materials handling equipment, such as fork lifts and the like, wherein the operation of the equipment is in the hands of an operator who may accidentally permit a relatively great load to descend at an unsafe rate. Furthermore, it is also desirable in operation of equipment of this type to effect rapid return of the equipment under no load conditions.

BRIEF DESCRIPTION OF THE DRAWINGS

The sole figure of the drawing is an elevational sectional view of a control valve made in accordance with the present invention.

DETAILED DESCRIPTION

Referring to the drawing, the control valve of the present invention is indicated generally by reference numeral 10 and includes a housing or body 12 having formed therein a bore 14 and a counterbore 16 in communication therewith. The housing 12 is formed with an inlet 18 and an outlet 20.

A spool 22 has a body portion 24 slidably disposed in the bore 14 and a reduced-diameter portion 26 slidably disposed within the counterbore 16 and forming an annular shoulder 27. The spool 22 is formed at the right end thereof with a bore 28 and at the left end thereof with a restricted orifice 30. The body portion 24 has a face 31 thereon on the left side thereof exposed to pressure from inlet 18. A face 32 is provided at the end of the bore 28, parallel to face 31. Orifice 30 extends between faces 31 and 32. At the opposite end of spool 22 from face 31 is a face 33 surrounding bore 28 which is also parallel to face 31.

The outlet 20 communicates with a downstream conduit 34 and fluid communication between the conduit 34 and the bore 14 at the right side of the shoulder 27 is afforded by means of a passage 35. The spool 22 is biased to the left by means of spring 36.

The valve 10 is intended to control the flow of fluid through the return line of a single-acting hydraulic cylinder. Fluid flows from the hydraulic cylinder to the left side of the spool 22 through the inlet 18 and thence through the restricted orifice 30. Fluid flow through the orifice 30 creates a low pressure area at the right end of the orifice 30 because of the increased velocity of flow. Due to this pressure differential, the force acting on face 31 moves the spool 22 to the right, against the force of the spring 36, to throttle the outlet 20, thus effectively reducing the downstream flow through the passage 34. The pressure of the fluid in the passage 34 is brought to bear against the shoulder 27 by means of the conduit 35. Thus the back pressure of the downstream fluid assists the operation of the spring 36.

As the pressure of the fluid on the left side of the spool 22 increases in relation to the dead weight of the object supported by the hydraulic cylinder, the rate of flow through the orifice 30 increases and the pressure in the bore 28 decreases. It will be appreciated that the movement of the spool 22 is a direct function of the pressure differential on each side of the orifice 30 dependent upon the comparative areas of faces 31, 32 and 33. Increased pressure differences will move the spool 22 to the right and will throttle the outlet 20, limiting the increase in flow rate. This action will increase the difference of pressure between the inlet 18 and outlet 34 of the valve. The action of the fluid against the shoulder 27 is dependent upon the difference in pressure between outlet 18 and outlet 34 and will reduce flow by moving spool 22 further to the right.

In the event that the conduit 35 is opened to sump, the present valve is responsive to absolute pressure, i.e., the upstream pressure. As no back pressure is acting on shoulder 27, increased upstream pressure will move spool 22 to the right and will decrease the flow. Therefore flow rate at high upstream pressures will be diminished. Also under this condition, the flow of fluid cannot be cut off completely because the shoulder 27 limits the movement of the spool to the right so that the outlet 20 is always open to a predetermined extent.

The shoulder 27 functions as a differential pressure area. The pressure at the base of the bore 28 on face 32 is somewhat less than the pressure at the left side of the spool 22 acting on face 31 because of the pressure drop through the orifice 30. It will be apparent that the pressure within the bore 28 depends only on the flow rate. The resultant force acting on the spool 22 results from the total difference in force developed on face 31 due to inlet pressure and the force developed by the relatively lower pressure acting on faces 32 and 33, shoulder 27, and spring 36. The pressure exerted against the shoulder 27 depends only on back pressure in the system. In both instances, the pressure on the right side of the spool 22 is less than the upstream pressure. As a result, the spool 22 tends to move to the right to compress the spring 36 and throttle the flow of the fluid through the outlet 20.

The control valve of the present invention exhibits important advantages over variable flow valves of this type heretofore known. For example, the downstream pressure acting against the shoulder 27 assists the force of the spring 36 so as effectively to increase the range of the spring 36 as a direct function of the pressure difference between upstream and downstream. Furthermore, the present valve may be used in situations where the downstream pressure is insufficient to assist the spring 36. In that event, a predetermined minimum flow rate is possible. In addition, the present control valve is characterized by effectiveness in operation despite the reduction in the number of parts required by prior art valves having a similar purpose.

I claim:
1. A control valve for inversely varying the flow in a fluid circuit in response to pressure variations comprising a hollow valve body having an inlet and an outlet, a spool slidably disposed within said valve body, spring means operable to bias said spool away from said outlet to permit free fluid flow therethrough at a predetermined maxi- mum rate, means for incrementally moving said spool across said outlet to define a throttling means and throttle the fluid flow in response to increases in fluid pressure at said inlet, said last named means comprising a restricted orifice in said spool providing limited communication between one side and the other thereof and creating a low pressure area at the downstream side thereof, thereby compressing said spring means, and shoulder means on said spool, passage means connected to said outlet only at a point downstream of said throttling means and connecting said fluid pressure in said outlet to said shoulder means to assist the action of said spring means so that the effective throttling action is a function of the difference between inlet and outlet pressures.

2. A valve in accordance with claim 1 wherein said outlet is positioned to assume a predetermined minimum flow rate when the inlet pressure exceeds a predetermined value in excess of the outlet pressure.

3. A valve in accordance with claim 1 wherein said valve body is formed with a bore and a counterbore in fluid communication therewith and wherein said shoulder means divides said spool into a body portion slidable in said bore and an integral reduced diameter portion slidable in said counterbore.

4. A valve in accordance with claim 3 wherein said inlet is in communication with said bore and said outlet is in communication with said counterbore.

5. A control valve for inversely varying the flow in a fluid circuit in response to pressure variations comprising a hollow valve body having an inlet and an outlet, a spool slidably disposed within said valve body, spring means operable to bias said spool away from said outlet to permit free fluid flow therethrough at a predetermined maximum rate, means for incrementally moving said spool across said outlet to define a throttling means and throttle the fluid flow in response to increases in fluid pressure at said inlet, said last named means comprising a restricted orifice in said spool providing limited communication between one side and the other thereof and creating a low pressure area at the downstream side thereof, thereby compressing said spring means, and shoulder means on said spool, said valve body having a bore and a counterbore in fluid communication therewith and wherein said shoulder means divides said spool into a body portion slidable in said bore and an integral reduced diameter portion slidable in said counterbore, said inlet being in communication with said bore and said outlet being in communication with said counterbore, and passage means connected to said outlet at a point downstream of said throttling means and connecting said fluid pressure in said outlet to said bore adjacent said shoulder means to assist the action of said spring means so that the effective throttling action is a function of the difference between inlet and outlet pressures.

References Cited

UNITED STATES PATENTS

| 2,224,216 | 12/1940 | Coberly | 137—504 |
| 2,541,464 | 2/1951 | Davies | 137—504 XR |
| 2,800,141 | 7/1957 | Hedland | 137—504 XR |
| 2,917,074 | 12/1959 | Terry | 137—504 |
| 2,917,075 | 12/1959 | Terry | 137—504 |
| 3,112,764 | 12/1963 | Anderson et al. | 137—504 |
| 3,130,747 | 4/1964 | Benaway | 137—504 |
| 3,170,481 | 2/1965 | Presnell | 137—504 XR |
| 3,196,902 | 7/1965 | Richmond | 137—504 |

M. CARY NELSON, Primary Examiner

R. J. MILLER, Assistant Examiner